Sept. 22, 1964

A. P. BOEHMER ETAL 3,149,471

WATER CHILLER

Filed Feb. 9, 1962

Inventors:
Andrew P. Boehmer
and Boubene M. Jaremus
By: [signature] Atty.

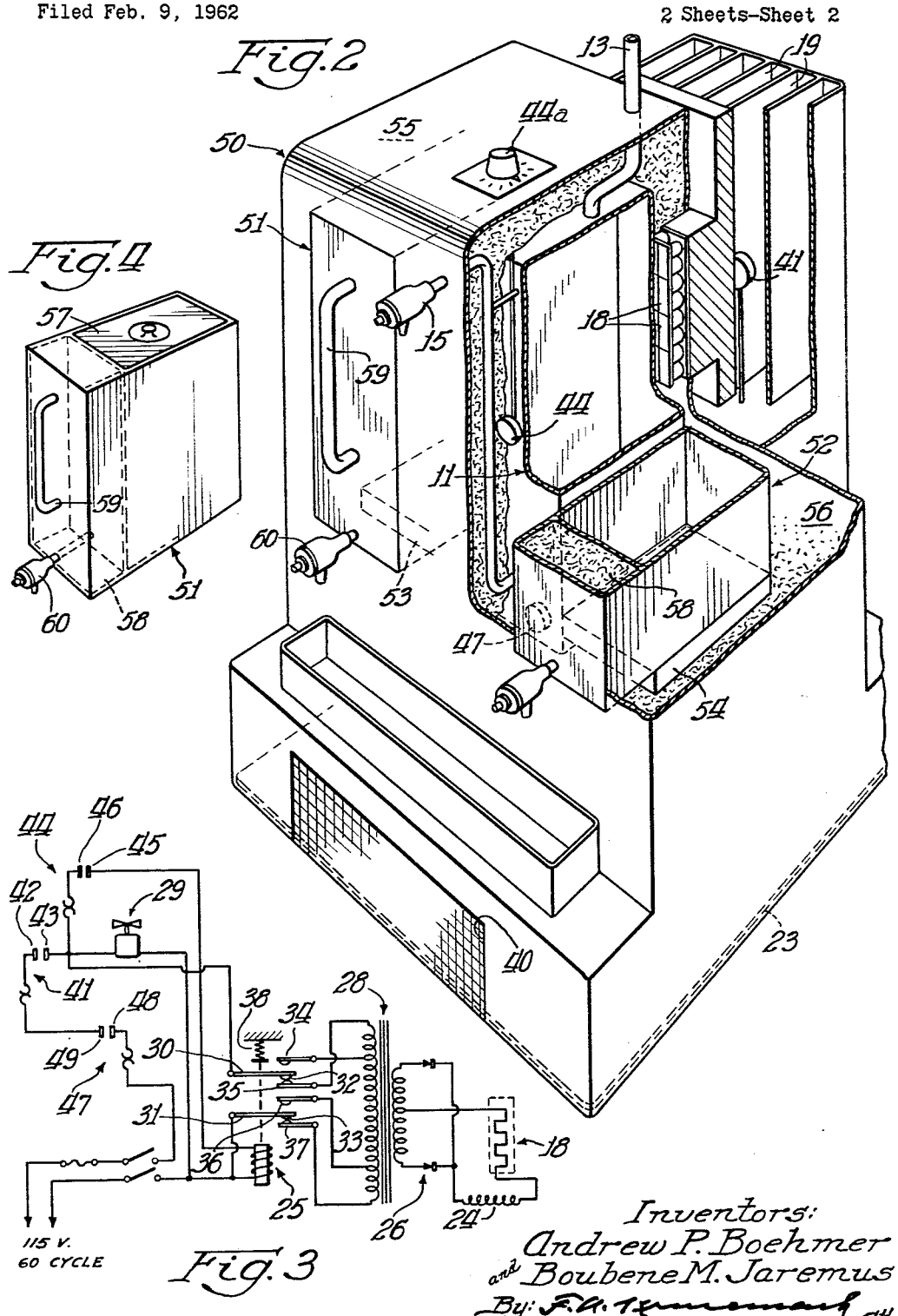

United States Patent Office 3,149,471
Patented Sept. 22, 1964

1

3,149,471
WATER CHILLER
Andrew P. Boehmer, Des Plaines, and Boubene M. Jaremus, Barrington, Ill., assignors to Borg-Warner Corporation, Chicago, Ill., a corporation of Illinois
Filed Feb. 9, 1962, Ser. No. 172,173
3 Claims. (Cl. 62—3)

The present invention relates to a potable liquid chiller and more particularly to a water chiller which is provided with thermoelectric couples for cooling water instead of a mechanical refrigeration system which is used in currently available water chillers or coolers. Water chiller or cooler systems which use mechanical refrigeration, comparatively speaking, are large in size because of inherent mechanics of the system. They cannot be made in small sizes economically.

The present invention contemplates the use of thermoelectric couples in the production of small units, preferably for domestic and commercial use, and can be made in extremely small sizes, economically, having a capacity as low as 1 to 5 oz. Because of its comparatively small size, it can be conveniently located and connected to a source of water supply and alternating-current (A.C.) electrical power thus providing a source for cool, fresh water from a tap.

It should be understood, however, that this device may be used for other potable liquids, such as, phosphate and other beverages, that require pressurized gases as part of their make-up.

It is therefore an object of the present invention to provide an improved water chiller using thermoelectric couples.

It is another object of the present invention to provide an improved water chiller which supplies pressurized water from a vessel thermoelectrically cooled to thereby prevent the loss of dissolved gases.

It is an important object of the present invention to provide an improved water chiller according to the present invention which is readily connectable to a source of water supply and a power source.

It is a further object of the present invention to provide an improved water chiller which is small in size, compact and economical to manufacture.

The present invention comprises a liquid container positioned within a case. The container has an inlet conduit, for connection to a source of liquid under pressure, and an outlet conduit near the bottom of the container, with faucet means in the outlet conduit. A thermoelectric assembly is disposed in heat exchange relationship with the container, and means for transferring electrical energy to the thermoelectric assembly is provided. An individual beverage container is also disposed in the case in physical contact with the liquid container. In accordance with an important aspect of this invention, a thermoconducive shelf is positioned to engage both the liquid container and the individual beverage container, whereby the latter container is cooled both by a direct conductive heat flow from the liquid container and by a second conductive heat flow over the shelf means.

The present invention consists of the novel constructions, arrangements, and devices to be hereinafter described and claimed for carrying out the above stated objects and such other objects as will appear from the following description of preferred forms of the invention, illustrated with reference to the accompanying drawings, wherein:

FIG. 2 is a perspective elevational view, partially broken away, similar to that shown in FIG. 1, showing a broken away portion of a beverage container on a shelf on one side of the water container and the handle and spigot of a companion beverage container in position on the opposite side of the water container;

FIG. 3 is a schematic diagram of the electrical circuit of the water chiller shown in FIGURES 1 and 2; and FIG. 4 is an elevational perspective view of one of a pair of beverage containers of FIG. 2.

Like characters of reference indicate like parts in the several views.

Figure 1:
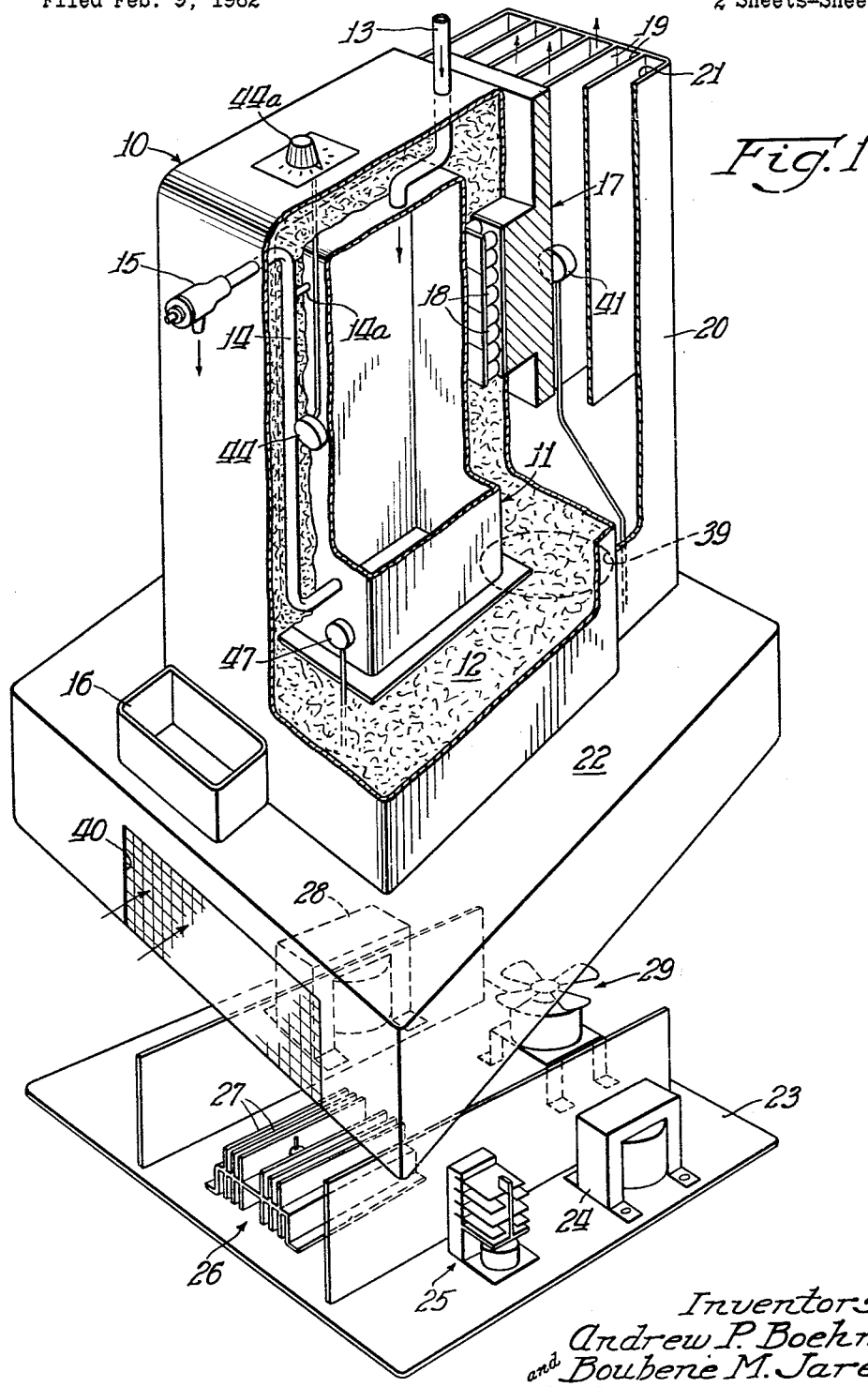
FIG. 1 is a perspective elevational view, partially broken away, of a water chiller according to the present invention; showing the components of the electrical system dropped from its position in the bottom of the case.

Referring now to FIG. 1, a water chiller according to the present invention is shown having a case 10, enclosing a pressurized water container 11 surrounded by insulation 12. The water container 11 is provided with a water inlet conduit 13 at the top thereof and a water outlet conduit 14 at the bottom thereof provided with a faucet or spigot 15. The outlet conduit 14 is connected at the bottom of the water container 11 so that water may be drawn from the coldest portion of the water in the container 11. An air vent passage 14a communicable between the top of the water container 11 and the upper end of the outlet conduit 14 is provided so that air may be purged from the water container 11 when the faucet 15 is open. A drip tray 16 is positioned below the faucet 15.

A thermoelectric assembly or heat pump 17 is connected with respect to case 10 and comprises thermoelectric modules 18 connected in series, and heat exchanger fins 19 enclosed in a housing 20 which has an opening 21 at the top. Although it is well known in the art, it should be pointed out that a thermoelectric assembly described herein comprises a junction of dissimilar thermoelectric elements commonly known as "N" and "P" material. A current flowing from an "N" material to a "P" material causes heat to be absorbed at the junction of the elements; conversely, current flowing from a "P" material to an "N" material causes heat to be dissipated at the junction.

A base portion 22 of the case 10 houses the components of an electrical circuit and components shown in FIG. 3. The electrical circuit and components are mounted on the topside of the panel 23 and comprise a filter choke 24, a high-low current relay 25, a rectifier 26 having cooling fins 27, a multiple tap primary power transformer 28 and a motor driven fan 29. The high-low current relay 25 is provided with a pair of armatures 30 and 31 carrying contact points 32 and 33, respectively. The multiple tap primary power transformer 28 is connected to a first pair of contacts 34 and 35 and a second pair of contacts 36 and 37 operably associated with the contacts 32 and 33, respectively. A compression spring 38 is biased in a direction so as to cause armatures 30 and 31 to make connection between contacts 32 and 35 and between contacts 33 and 37.

The multiple tap primary power transformer 28 is operable to provide a high current or a low current depending on the demands of the system as hereinafter more fully explained.

The base portion 22 is provided with an opening 39 communicating with the lower end of the housing 20. The fan 29 is positioned below the opening 39, whereby, when in operation air is drawn through the heat exchanger fins 19. The base portion 22 is also provided with an opening 40 at the front thereof for the admission of air.

A hot fin high temperature cutout 41 is positioned to sense the heat flowing from the thermoelectric modules 18 and coupled in the electrical circuit and is provided with a pair of contacts 42 and 43 operable by means of a currently available bi-metal thermostat. An adjustable water temperature thermostat 44 is positioned to sense the temperature of the water within the pressurized water container 11 and coupled in the electrical circuit and is provided with a pair of contact points 45 and 46 and a control knob 44a. A freezing cutout thermostat 47 is positioned to sense the temperature of the water nearer the lower end of the pressurized container 11 and coupled in the electrical circuit and is provided with a pair of contact points 48 and 49.

Reference is now made to FIG. 2 showing a modified form of the present invention which is similar to that shown in FIG. 1 and differs in that a larger case 50 is provided so as to accommodate a pair of beverage containers 51 and 52, resting on a pair of thermal conductive shelves 53 and 54, respectively, on opposite sides of the pressurized container 11, in compartments 55 and 56, respectively. Accordingly there is a cooling effected by conduction from each of the individual beverage containers 51 and 52 to central container 11, not only along the side of each beverage container which contacts a wall of container 11, but also along the shelves 53 and 54 which not only contact the bottom of the two individual beverage containers but also engage a side portion of the cooled central container. A perspective view of one of the pair of beverage containers 51 is shown. Each of the pair of beverage containers 51 and 52 is provided with a cover 57 having an insulated portion 58 at the front thereof. A handle 59 and a faucet 60 which is connected to the bottom end of the beverage container 51 are also provided, which applies also to the beverage container 52.

In operation the water chiller according to the present invention is suitably placed and the water inlet 13 is connected to a source of water supply under pressure. The electrical circuit is connected to a source of electrical power by means well known in the art. In order to supply water to the pressurized water container the faucet 15 is opened to purge the air therefrom as the container is being filled, after which the faucet 15 is closed.

The adjustable water temperature thermostat 44 is provided to select the temperature desired. It is independent of the operation of the hot fin high temperature cutout 41 and the freezing cutout thermostat 47 as is apparent from the electric circuit diagram. The bi-metal thermostats of the hot fin high temperature cutout 41 and the freezing cutout thermostat 47 are such that the contact points 42 and 43, and 48 and 49, respectively, are closed. When the water in the pressurized water container 11 is above the temperature at which the adjustable water temperature thermostat 44 has been set, the bi-metal thermostat is such that the contacts 45 and 46 are also closed, causing current to pass through the high-low current relay 25 as is apparent from the electrical circuit diagram, thereby energizing the coil of the high-low current relay 25 whereby armatures 30 and 31 are caused to move against the compression spring 38 and make connection between contacts 32 and 34, and between contacts 33 and 36. A high current thus flows out of the secondary of the power transformer 28 which causes maximum cooling in the thermoelectric modules. It is evident from the showing in FIGURE 3 that, as the temperature sensed by thermostat 44 reaches that which is preset by rotation of knob 44a, contacts 45 and 46 are opened to interrupt energy transfer to the winding of relay 25, causing this relay to release. Under the urging of spring 38 the armatures and contacts are returned to the positions indicated in FIGURE 3. In the released position of relay 25, a lower current flows through the secondary winding of transformer 28, so that the liquid within container 11 is maintained cool without wasting undue energy after the liquid has been cooled to the preset temperature.

The fan 29 is provided to facilitate the dissipation of heat from the fins 19 as the air from the fan 29 is directed between them thereby increasing the cooling effect of the thermoelectric modules 18 which are removing heat from the pressurized water container 11. Should the room temperature drop such as to cause the water to near the freezing point, contacts 48 and 49 of freezing cutout thermostat 47 will open which interrupts the transfer of all power to the system. Similarly, should fan 29 malfunction, contacts 42 and 43 of hot fin high temperature cutout 41 open, causing power to stop flowing into the system.

In FIG. 2 an additional feature is shown; namely, that of providing a pair of beverage containers 51 and 52 resting on a pair of thermal conductive shelves 53 and 54 on opposite sides of the pressurized container 11 in compartments 55 and 56, respectively. The beverage containers 51 and 52 are provided with covers, as shown by numeral 57, which are removable for filling the containers, after which they are placed in their respective compartments for cooling. As shown, faucets are provided as a matter of convenience.

We wish it to be understood that our invention is not to be limited to the specific constructions and arrangements shown and described, except only insofar as the claims may be so interpreted, as it will be understood to those skilled in the art that changes may be made without departing from the principles of the invention.

We claim:

1. A thermoelectric water chiller comprising a case defining a central compartment and a pair of additional compartments disposed adjacent said central compartment, insulation within said case substantially surrounding said compartments, a liquid container disposed within said central compartment and having an inlet conduit for connection to a source of liquid under pressure, an outlet conduit coupled to said container near the bottom thereof, a faucet coupled in said outlet conduit, a purge vent coupled between the top of said liquid container and an upper part of said outlet conduit, a thermoelectric assembly comprising thermoelectric modules of dissimilar materials disposed in heat exchange relationship with respect to said liquid container to absorb heat therefrom, electrical circuitry coupled to said thermoelectric assembly for transferring D.C. energy thereto, first and second beverage containers removably positioned in said additional compartments, and first and second thermoconductive shelves, each positioned to contact one of said first and second beverage containers and to contact said liquid container, thereby to effect a cooling of said first and second beverage containers.

2. A thermoelectric water chiller as set forth in claim 1 in which each of said first and second beverage containers includes a cover, a spigot, and a handle to facilitate removal of each container from its respective compartment.

3. A thermoelectric water chiller comprising a case, a liquid container positioned within said case and having an inlet conduit for connection to a source of liquid under pressure, an outlet conduit coupled to said liquid container near the bottom thereof, faucet means coupled in said outlet conduit, a thermoelectric assembly including thermoelectric modules of dissimilar materials disposed in heat exchange relationship with said liquid container to absorb heat therefrom, means for transferring electrical energy from a source of unidirectional power to said thermoelectric assembly to cool said liquid container, an individual beverage container disposed in said case in physical contact with said liquid container, and thermoconductive shelf means positioned to engage both of said containers, whereby said individual beverage container is cooled by conductive heat flow from said individual beverage container directly to said liquid container and by conductive heat flow from said individual beverage container over said shelf means to said liquid container.

References Cited in the file of this patent

UNITED STATES PATENTS

| | | |
|---|---|---|
| 1,518,991 | Cordley | Dec. 9, 1924 |
| 1,860,379 | Blood | May 31, 1932 |
| 2,151,104 | Heitman | Mar. 21, 1939 |
| 2,675,686 | Dickinson | Apr. 20, 1954 |
| 2,914,218 | Korodi | Nov. 24, 1959 |
| 2,922,284 | Danielson | Jan. 26, 1960 |
| 2,931,188 | Levit | Apr. 5, 1960 |
| 2,986,009 | Gaysowski | May 30, 1961 |
| 2,991,628 | Tuck | July 11, 1961 |